(12) United States Patent
Schulze et al.

(10) Patent No.: US 11,458,858 B2
(45) Date of Patent: Oct. 4, 2022

(54) METHOD AND APPARATUS FOR ENERGY MANAGEMENT FOR AN ELECTRIC VEHICLE CHARGING SYSTEM

(71) Applicant: Dr. Ing. h.c. F. Porsche Aktiengesellschaft, Stuttgart (DE)

(72) Inventors: Simon Schulze, Urbach (DE); Barry Sole, Pforzheim (DE); Ralf Oestreicher, Sindelfingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 334 days.

(21) Appl. No.: 16/781,024

(22) Filed: Feb. 4, 2020

(65) Prior Publication Data

US 2020/0290471 A1    Sep. 17, 2020

(30) Foreign Application Priority Data

Mar. 13, 2019    (DE) .................. 10 2019 106341.8

(51) Int. Cl.
| | |
|---|---|
| *B60L 53/62* | (2019.01) |
| *G05B 15/02* | (2006.01) |
| *B60L 53/66* | (2019.01) |

(52) U.S. Cl.
CPC ............. *B60L 53/62* (2019.02); *B60L 53/66* (2019.02); *G05B 15/02* (2013.01); *G05B 2219/2642* (2013.01)

(58) Field of Classification Search
CPC ......... B60L 53/62; B60L 53/66; G05B 15/02; G05B 2219/2642; Y02T 10/70; Y02T 10/7072; Y02T 90/12; Y02T 90/16; H02J 4/00; H02J 13/00; G01R 19/0092; G01R 33/02
See application file for complete search history.

(56) References Cited

U.S. PATENT DOCUMENTS

| | | | | |
|---|---|---|---|---|
| 2012/0022811 | A1* | 1/2012 | Dickinson | B60L 53/18 235/382 |
| 2015/0015213 | A1* | 1/2015 | Brooks | H02J 3/24 320/137 |
| 2015/0048800 | A1* | 2/2015 | Hirning | B60L 53/16 320/137 |
| 2015/0226559 | A1* | 8/2015 | Waite | G01C 21/20 701/23 |
| 2016/0327615 | A1* | 11/2016 | Wallace | G01R 31/52 |
| 2018/0159326 | A1 | 6/2018 | Sole et al. | |
| 2020/0290471 | A1* | 9/2020 | Schulze | B60L 53/66 |
| 2021/0391758 | A1* | 12/2021 | Avestruz | H02J 50/10 |

FOREIGN PATENT DOCUMENTS

| | | |
|---|---|---|
| DE | 202012008606 U1 | 12/2013 |
| JP | 2012050236 A | 3/2012 |
| WO | 2011078390 A1 | 6/2011 |
| WO | WO-2013144947 A2 * | 10/2013 .......... B60L 11/1816 |

* cited by examiner

*Primary Examiner* — Nha T Nguyen

(74) *Attorney, Agent, or Firm* — RatnerPrestia

(57) ABSTRACT

A method and an apparatus for energy management including an input for a first sensor, which is designed to detect a first measurement variable as information about a current to a home energy management system. A device is designed to determine a second measurement variable depending on the first measurement variable. An output designed to output the second measurement variable, instead of the first measurement variable, as information about a current to the home energy management system for the home energy management system.

15 Claims, 3 Drawing Sheets

Figure 1:
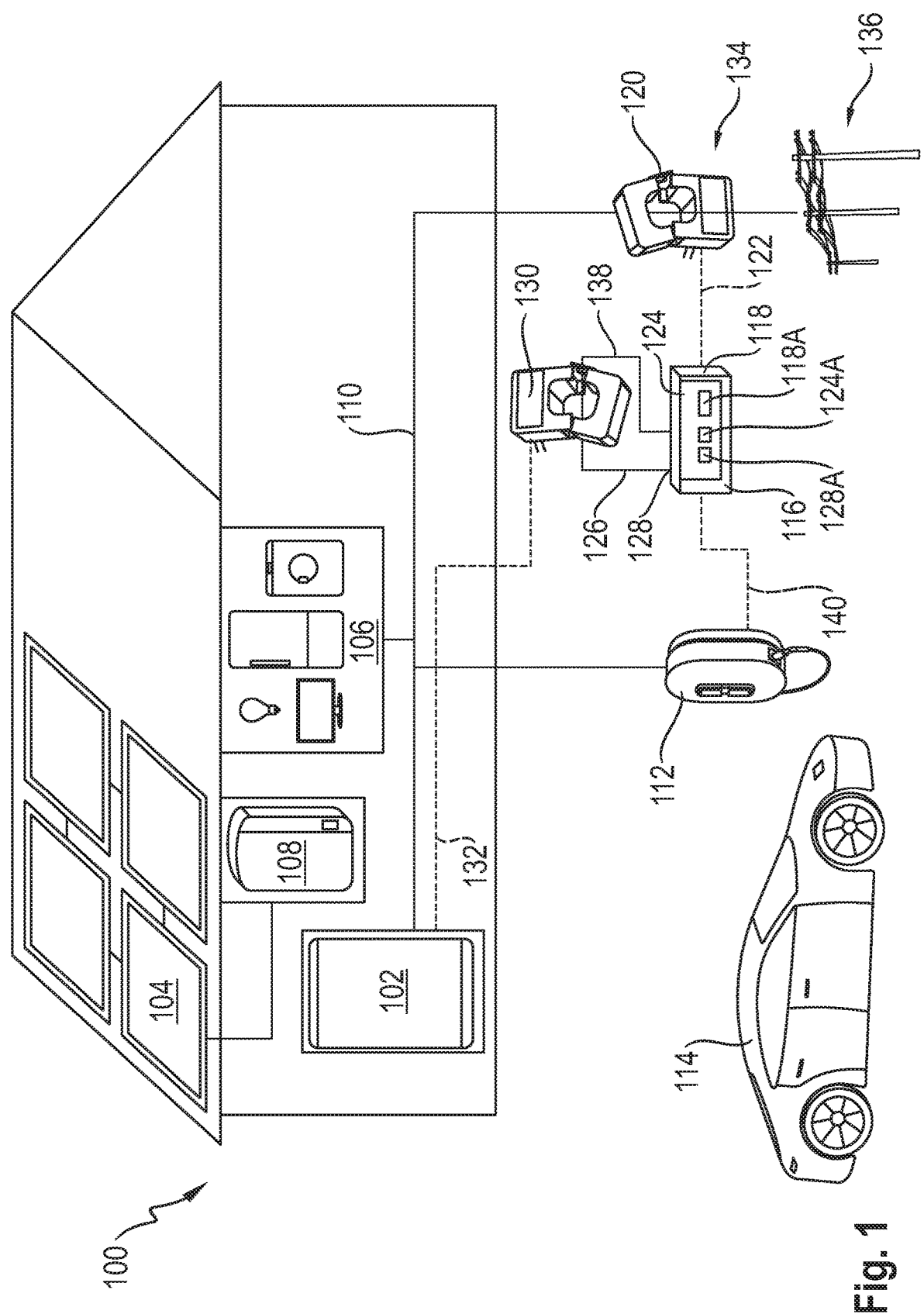

METHOD AND APPARATUS FOR ENERGY MANAGEMENT FOR AN ELECTRIC VEHICLE CHARGING SYSTEM

CROSS-REFERENCE TO RELATED APPLICATION

This application claims priority to German Patent Application No. 10 2019 106341.8, filed Mar. 13, 2019, the content of such application being incorporated by reference herein in its entirety.

FIELD OF THE INVENTION

The invention relates to a method and an apparatus for energy management.

BACKGROUND OF THE INVENTION

JP 2012050236 and US2018159326, each of which is incorporated by reference in its entirety, disclose home energy management systems that are suitable for charging electric vehicles by means of an electric vehicle charging system. For overall smooth energy management, these systems must be compatible with one another. It is therefore desirable to provide a possibility of integrating an electric vehicle charging system into an already existing home energy management system.

SUMMARY OF THE INVENTION

A method for energy management makes provision for a first measurement variable to be detected at a first sensor as information about a current to a home energy management system, wherein a second measurement variable is determined depending on the first measurement variable, wherein, instead of the first measurement variable, the second measurement variable is output as information about a current to the home energy management system for the home energy management system. Therefore, an alternative measurement value can be prescribed in order to prevent undesired effects occurring in the home energy management system when an electric vehicle charging system is connected.

Provision is preferably made for the second measurement variable to be output as information about the current to the home energy management system in an analog or digital manner for measurement by a second sensor for the home energy management system. The alternative measurement value is thus able to be output simply to a home energy management system, which uses a sensor for current measurement.

Provision is preferably made for the second measurement variable to be output as a sensor signal in an analog or digital manner to the home energy management system. The alternative measurement value is thus able to be output simply to a home energy management system without an additional sensor for current measurement having to be used.

The first measurement variable is preferably determined at a connection point of the home energy management system to an energy supplier network. The alternative measurement value is measured at the same location at which home energy management systems usually also provide the measurement.

A current at the connection point of the home energy management system to the energy supplier network is preferably determined as first measurement variable. This simplifies the determination of the alternative measurement values.

The second measurement variable is preferably a current or an electromagnetic field that simulates a current. Said analog signals can be coupled in directly by means of a current sensor of the home energy management system.

An electromagnetic signal is preferably produced for a measurement by the second sensor. As a result, no real power has to be applied when the second measurement variable is output.

An apparatus for energy management comprises a first sensor, which is designed to detect a first measurement variable as information about a current to a home energy management system, a device, which is designed to determine a second measurement variable depending on the first measurement variable, and an output, which is designed to output, instead of the first measurement variable, the second measurement variable as information about a current to the home energy management system. This makes it possible to simply integrate an electric vehicle charging system into a home energy management system without elements of the home energy management system having to be changed.

Provision is preferably made for the output to be designed to output the second measurement variable as information about the current to the home energy management system in an analog or digital manner for measurement by a second sensor for the home energy management system. This makes it possible to connect the apparatus for energy management directly to a sensor for current measurement that is already installed in the home energy management system.

The output is preferably designed to output the second measurement variable as a sensor signal in an analog or digital manner to the home energy management system. This makes it possible to connect the apparatus for energy management directly to home energy management system that is already installed.

The first sensor is preferably designed to determine the first measurement variable at a connection point of the home energy management system to an energy supplier network. Using the first the measurement variable, information about the energy provided by the energy supplier network is determined at the location to which the home energy management system and the electric vehicle charging system are connected.

The first sensor is preferably designed to determine a current at the connection point of the home energy management system to the energy supplier network as first measurement variable. For home energy management systems with a current sensor, this simplifies the determination of the alternative measurement values.

The output is preferably designed to output as second measurement variable a current or an electromagnetic field that simulates a current. This simplifies the installation of the apparatus without having to make changes to the home energy management system.

The output preferably comprises a coil, which is designed to produce an electromagnetic signal for a measurement by the second sensor. The application of a real power can therefore be prevented.

BRIEF DESCRIPTION OF THE DRAWING FIGURES

Figure 2:
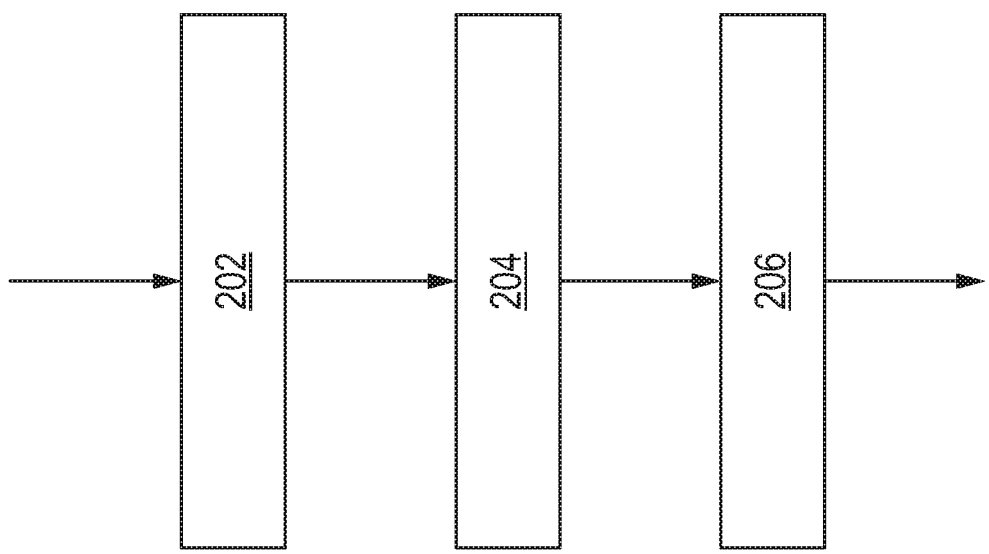
Figure 3:
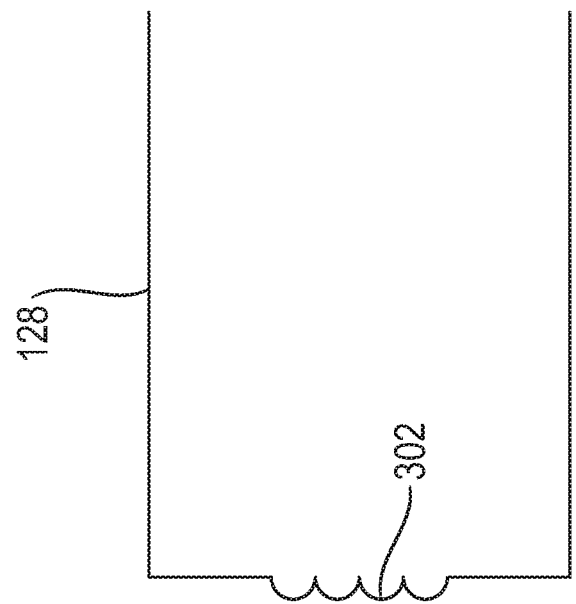
Figure 3:
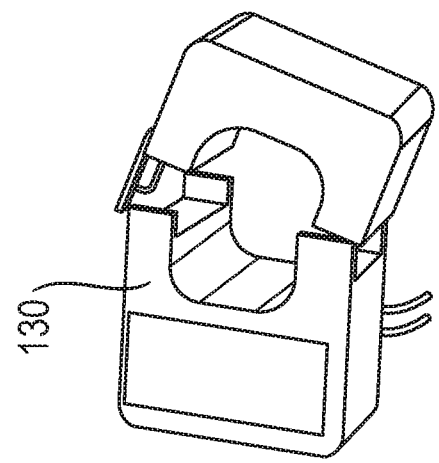

Further advantageous refinements emerge from the following description and the drawing. In the drawing:

FIG. 1 shows a schematic illustration of parts of a home energy management system, FIG. 2 shows a schematic illustration of a method for energy management, FIG. 3 shows a schematic illustration of a part of the home energy management system.

DETAILED DESCRIPTION OF THE INVENTION

FIG. 1 shows a schematic illustration of parts of a home energy management system 100. The home energy management system 100 comprises a home storage system 102, a photovoltaic device 104, one or more consumers 106, an inverter 108, which connects the photovoltaic device 104 to a home electricity grid 110, to which the consumer or consumers 106 and the home storage system 102 are connected.

An electric vehicle charging system 112 for an electric vehicle 114 and an apparatus for energy management 116 are connected to the home electricity grid 110.

The apparatus 116 comprises an input 118 for a first sensor 120, which is designed to detect a first measurement variable 122 as information about a current to the home energy management system 100. The apparatus 116 comprises a device 124, which is designed to determine a second measurement variable 126 depending on the first measurement variable 122. More specifically, the first measurement variable 122 is changed to the second measurement variable 126 at least during operation of the electric vehicle charging system 112.

The apparatus 116 comprises an output 128. In the example, the output 128 is designed to output the second measurement variable 126 for measurement by a second sensor 130 for the home energy management system 100. In the example, the output 128 is designed to output the second measurement variable 126 as information about the current to the home energy management system 100 in an analog manner for measurement by the second sensor 130 for the home energy management system 100. For a second sensor 130 that makes it possible, the information can also be output in a digital manner.

As an alternative, the output 128 can be designed to output the second measurement variable 126 as a sensor signal in an analog or digital manner to the home energy management system 100. In this case, the second sensor 130 can be omitted. Instead, in this case, the output 128 is connected to a signal line 132 between the sensor 130 and the home storage system 102.

The device 124 can be embodied as an analog switching technology. The device 124 preferably comprises an analog-to-digital converter 118A at the input 118 and a digital-to-analog converter 128A at the output 128 as well as a microprocessor 124A, which is designed to determine the second measurement variable 126 depending on the first measurement variable 122. The microprocessor 124A is preferably designed to change the first measurement variable 122 to the second measurement variable 126 for example during operation of the electric vehicle charging system 112. The microprocessor 124A makes it possible to store and process the functionality that makes it possible to change the measurement variables within the context of the compatibility of the systems. Instead of the microprocessor 124A, a processor and a separate storage system, which enable the functionality, can also be provided.

Independently of the embodiment of the device 124, the device 124 provides the possibility of adapting a conventional electric vehicle charging system 112 and a home energy management system 100 to one another without the electric vehicle charging system 112 or the home energy management system 100 themselves having to be adapted. In the event that the electric vehicle charging system 112 is already adapted for an existing home energy management system 100, the device 124 can be designed as an interface for the charging system 112 such that the home energy management system 100 itself does not have to be adapted.

In the example, the first sensor 120 is designed to determine the first measurement variable 122 at a connection point 134 of the home energy management system 100 to an energy supplier network 136. In the example, the first sensor 120 is designed to determine a current at the connection point 134 of the home energy management system 100 to the energy supplier network 136 as first measurement variable 122.

In the example, the output 128 is designed to output as the second measurement variable 126 a current that simulates a current. In the example, the simulated current flows across the second sensor 130 via a connecting line 138. An arbitrary current profile different from the actual current profile at the connection point 134 can thus be prescribed to the second sensor 130. In the example, actuation signals for the electric vehicle charging system 112 are transmitted from the apparatus 116 to the electric vehicle charging system 112 via an actuation line 140. Said actuation line can likewise be a current signal of a current sensor otherwise connected to the electric vehicle charging system 112. When the electric vehicle charging system 112 makes it possible, a separate actuation can also be transmitted instead of or in addition to information about a current. The sensors may comprise a coil, which is wound around a cable in which the current that is to be measured flows. The sensors may be designed as current clamps.

As an alternative thereto, the output 128 may be designed, as illustrated in FIG. 3, to output as the second measurement variable 126 an electromagnetic field that simulates a current. In this case, the output 128 comprises a coil 302, which is designed to produce an electromagnetic signal for a measurement by the second sensor 130.

Instead of the described current measurement and current change, another variable relevant for the control of the home energy management system 100 can also be detected and changed. For example, a control variable relevant to charging and discharging the home storage system 102 is detected and changed.

A method for energy management is described in the following text with reference to FIG. 2.

In a step 202, the first measurement variable 122 is detected at the first sensor 120 as information about the current to the home energy management system 100. In the example, the first measurement variable 122 is determined at the connection point 134 of the home energy management system 100 to the energy supplier network 136. The current is determined at the connection point 134 of the home energy management system 100 to the energy supplier network 136 as first measurement variable 122. Other measurement points, for example in the home electricity grid, are also possible.

A step 204 is then executed.

In step 204, the first measurement variable 122 is changed to a second measurement variable 126. In the example, the change is determined based on information present due to the current measurement at the connection point 134. Alternative measurement values for the output as second measurement variable 126 are determined so that the home energy management system 100 and the electric vehicle charging system 112 provided for charging electric vehicles together result in smooth energy management. Provision may be made for information about the first measurement variable 122, in particular the measured current, to additionally be transmitted to the electric vehicle charging system 112. In addition or as an alternative thereto, provision may be made for the electric vehicle charging system 112 to be actuated directly.

A step 206 is then executed.

In step 206, the second measurement variable 126 for the home energy management system 100 is output. In the example, the second measurement variable 126 is output as information about the current to the home energy management system 100 in an analog manner for measurement by the second sensor 130 for the home energy management system. Instead, the second measurement variable 126 can also be output as a sensor signal in an analog or digital manner to the home energy management system 100. In the example, the second measurement variable 126 is a current. However, the second measurement variable 126 can also be output as an electromagnetic field that simulates a current. In this case, the electromagnetic signal is produced for the measurement by the second sensor 130.

FIG. 3 illustrates a schematic illustration of a part of the home energy management system 100 in which a coil 302 is provided at the output 128. The coil 302 is designed to produce an electromagnetic signal for a measurement by the second sensor 130. In this example, the second sensor 130 comprises a coil for measuring the electromagnetic signal. This enables an installation in which no real power is transmitted between the coil 302 and the second sensor 130.

What is claimed:

1. A method for energy management comprising:
   detecting a first measurement variable as an output of a first sensor measuring current supplied to a home energy management system from a power grid, the first measurement variable indicating current to the home energy management system,
   determining a second measurement variable by changing the first measurement variable to the second measurement variable during operation of an electric vehicle charging system, the second measurement variable indicating the current to the home energy management system, and
   outputting the second measurement variable, instead of the first measurement variable, to the home energy management system.

2. The method as claimed in claim 1, further comprising outputting the second measurement variable as information about the current to the home energy management system in an analog or digital manner for measurement by a second sensor for the home energy management system.

3. The method as claimed in claim 1, further comprising outputting the second measurement variable as a sensor signal in an analog or digital manner to the home energy management system.

4. The method as claimed in claim 1, further comprising determining the first measurement variable at a connection point of the home energy management system to an energy supplier network.

5. The method as claimed in claim 4, further comprising determining as the first measurement variable a current at the connection point of the home energy management system to the energy supplier network.

6. The method as claimed in claim 2, wherein the second measurement variable is a current or an electromagnetic field that simulates a current.

7. The method as claimed in claim 6, further comprising producing an electromagnetic signal for a measurement by the second sensor.

8. An apparatus for energy management, said apparatus comprising:
   a first sensor that is configured to detect a first measurement variable, the first sensor measuring current supplied to a home energy management system from a power grid, the first measurement variable indicating current to the home energy management system,
   a device configured to determine a second measurement variable by changing the first measurement variable to the second measurement variable during operation of an electric vehicle charging system, the second measurement variable indicating the current to the home energy management system, and
   an output configured to output the second measurement variable, instead of the first measurement variable, to the home energy management system.

9. The apparatus as claimed in claim 8, wherein the output is configured to output the second measurement variable as information about the current to the home energy management system in an analog or digital manner for measurement by a second sensor for the home energy management system.

10. The apparatus as claimed in claim 8, wherein the output is configured to output the second measurement variable as a sensor signal in an analog or digital manner to the home energy management system.

11. The apparatus as claimed in claim 8, wherein the first sensor is configured to determine the first measurement variable at a connection point of the home energy management system to an energy supplier network.

12. The apparatus as claimed in claim 11, wherein the first sensor is configured to determine a current at the connection point of the home energy management system to the energy supplier network as the first measurement variable.

13. The apparatus as claimed in claim 12, wherein the output is configured to output as the second measurement variable a current or an electromagnetic field that simulates a current.

14. The apparatus as claimed in claim 13, wherein the output comprises a coil configured to produce an electromagnetic signal for a measurement by a second sensor.

15. The apparatus as claimed in claim 8, wherein the device is configured to adapt the home energy management system and the electric vehicle charging system together without modification to the home energy management system and the electric vehicle charging system.

* * * * *